(12) United States Patent
Ulbricht et al.

(10) Patent No.: US 11,188,787 B1
(45) Date of Patent: Nov. 30, 2021

(54) END-TO-END ROOM LAYOUT ESTIMATION

(71) Applicant: Apple Inc., Cupertino, CA (US)

(72) Inventors: Daniel Ulbricht, Sunnyvale, CA (US);
Chen-Yu Lee, Sunnyvale, CA (US);
Amit Kumar K C, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 131 days.

(21) Appl. No.: 16/582,722

(22) Filed: Sep. 25, 2019

Related U.S. Application Data

(60) Provisional application No. 62/738,858, filed on Sep. 28, 2018.

(51) Int. Cl.
*G06K 9/62* (2006.01)
*G06T 11/60* (2006.01)
*G06K 9/46* (2006.01)

(52) U.S. Cl.
CPC .......... *G06K 9/6232* (2013.01); *G06K 9/46* (2013.01); *G06T 11/60* (2013.01)

(58) Field of Classification Search
CPC ........... G06T 19/20; G06T 2207/10012; G06T 2207/10028; G06T 2207/30244; G06T 2219/2004; G06T 2219/2016; G06T 7/75; G06T 7/55; G06T 7/60; G06T 7/70; G06T 7/73; G06K 2009/2045; G06K 2209/40; G06K 9/00214; G06K 9/209; G06K 9/3233; G06K 9/4604; G06K 9/4671
See application file for complete search history.

(56) References Cited

U.S. PATENT DOCUMENTS

| 5,533,177 A | 7/1996 | Wirtz |
| 2018/0268220 A1 | 9/2018 | Lee |
| 2019/0221000 A1* | 7/2019 | Li-Chee-Ming .......... G06T 7/75 |

OTHER PUBLICATIONS

Hedau, et al., "Recovering the Spatial Layout of Cluttered Rooms," 2009 IEEE 12th International Conference on Computer Vision, Sep. 29, 2009.
Javanmardi, et al. "Image Segmentation by Deep Learning of Disjunctive Normal Shape Model Shape Representation," IEEE Transactions on Medical Imaging, Sep. 26, 2017.
Kim, et al., "Room Layout Estimation with Object and Material Attributes Information using a Spherical Camera," 2016 Fourth International Conference on 3D Vision, Oct. 25, 2016.

(Continued)

*Primary Examiner* — Manuchehr Rahmjoo
(74) *Attorney, Agent, or Firm* — Blank Rome LLP

(57) ABSTRACT

Systems, methods, and computer readable media to implementing an end-to-end room layout estimation are described. A room layout estimation engine performs feature extraction on an image frame to generate a first set of coefficients for a first room layout class and a second set of coefficients for a second room layout class. Afterwards, the room layout estimation engine generates a first set of planes according to the first set of coefficients and a second set of planes according to the second set of coefficients. The room layout estimation engine generates a first prediction plane according to the first set of planes and a second prediction plane according to the second set of planes. Afterwards, the room layout estimation engine merges the first prediction plane and the second prediction plane to generate a predicted room layout for the room.

20 Claims, 5 Drawing Sheets

(56) References Cited

OTHER PUBLICATIONS

Lee, et al., "RoomNet: End-to-End Room Layout Estimation," Aug. 7, 2017.
Ramesh, et al., "Disjunctive Normal Shape Models," 2015 IEEE 12th International Symposium on Biomedical Imaging (ISBI), Apr. 16, 2015.
Ren, Yuzhuo, and C.-C. Jay Kuo, "A Coarse-to-Fine Indoor Layout Estimation (CFILE) Method," Jul. 15, 2016.

* cited by examiner

END-TO-END ROOM LAYOUT ESTIMATION

BACKGROUND

This disclosure relates generally to the field of machine learning computing systems. More particularly, but not by way of limitation, the disclosure relates to implementing machine learning operations to realize an end-to-end room layout estimation.

To understand and generate decisions based on a physical environment's contexts, computer vision operations often involve having a computing system extract and analyze digital images. Specifically, computer vision operations generally employ an image capturing device, such as a camera or a video recorder, to capture one or more image frames for a physical environment. For example, Simultaneous Localization and Mapping (SLAM) technology is able to determine the orientation and/or position of a system relative to a physical environment by utilizing image frames and/or other sensor information, such as inertia-based measurements. SLAM applies the sensor information from a number of sample points to create a scaled geometrical model of the physical environment without requiring pre-knowledge of the physical environment.

Unfortunately, because SLAM typically is limited to a specific number of sample points, the scaled geometrical model can be a sparse representation of the physical environment.

Other computer vision operations are currently being developed to generate a more complete representation of a physical environment. As an example, a room layout estimation operation aims to use an image frame (e.g., a two dimensional 2D image frame) to estimate semantic room geometries, such as the room size and the planar configurations of the physical room. The room layout estimation operation then utilizes the semantic room geometries to form a predicted room layout representation. Generating an accurate room layout representation may be applicable in a wide variety of computer vision-based applications that include navigation in an indoor room, scene reconstruction and/or rendering, and Augmented Reality (AR). Thus, continuous improvement in generating a more complete and accurate representation of a physical environment can be beneficial for a wide range of technologies.

SUMMARY

In one embodiment, a non-transitory program storage device, readable by one or more processors and comprising instructions stored thereon to cause the one or more processors to perform feature extraction on an image frame to generate a first set of coefficients for a first room layout class and a second set of coefficients for a second room layout class. The processors generate, with one or more disjunctive normal models, a first set of planes based on the first set of coefficients and a second set of planes based on the second set of coefficients. The processors then generate, with the one or more disjunctive normal models, a first prediction plane based on the first set of planes and a second prediction plane based on the second set of planes. The processors combine the first prediction plane and the second prediction plane to generate a predicted room layout for the room.

In another embodiment, a system that comprises memory comprising instructions and at least one processor coupled to memory, where the instructions, when executed, causes the at least one processor to perform feature extraction on an image frame to generate a first set of coefficients for a first room layout class and a second set of coefficients for a second room layout class. The at least one processor generates a first set of planes according to the first set of coefficients and a first disjunctive normal model a second set of planes according to the second set of coefficients and a second disjunctive normal model. The at least one processor generates a first prediction plane according to the first set of planes and the first disjunctive normal model and a second prediction plane according to the second set of planes and the second disjunctive normal model. The at least one processor merges the first prediction plane and the second prediction plane to generate a predicted room layout for the room.

In yet another embodiment a method comprising performing feature extraction on an image frame to generate a first set of coefficients for a first room layout class and a second set of coefficients for a second room layout class. The example method generates a first set of planes according to the first set of coefficients and a first disjunctive normal model a second set of planes according to the second set of coefficients and a second disjunctive normal model. The example method generates a first prediction plane according to the first set of planes and the first disjunctive normal model and a second prediction plane according to the second set of planes and the second disjunctive normal model. The example method merges the first prediction plane and the second prediction plane to generate a predicted room layout for the room.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
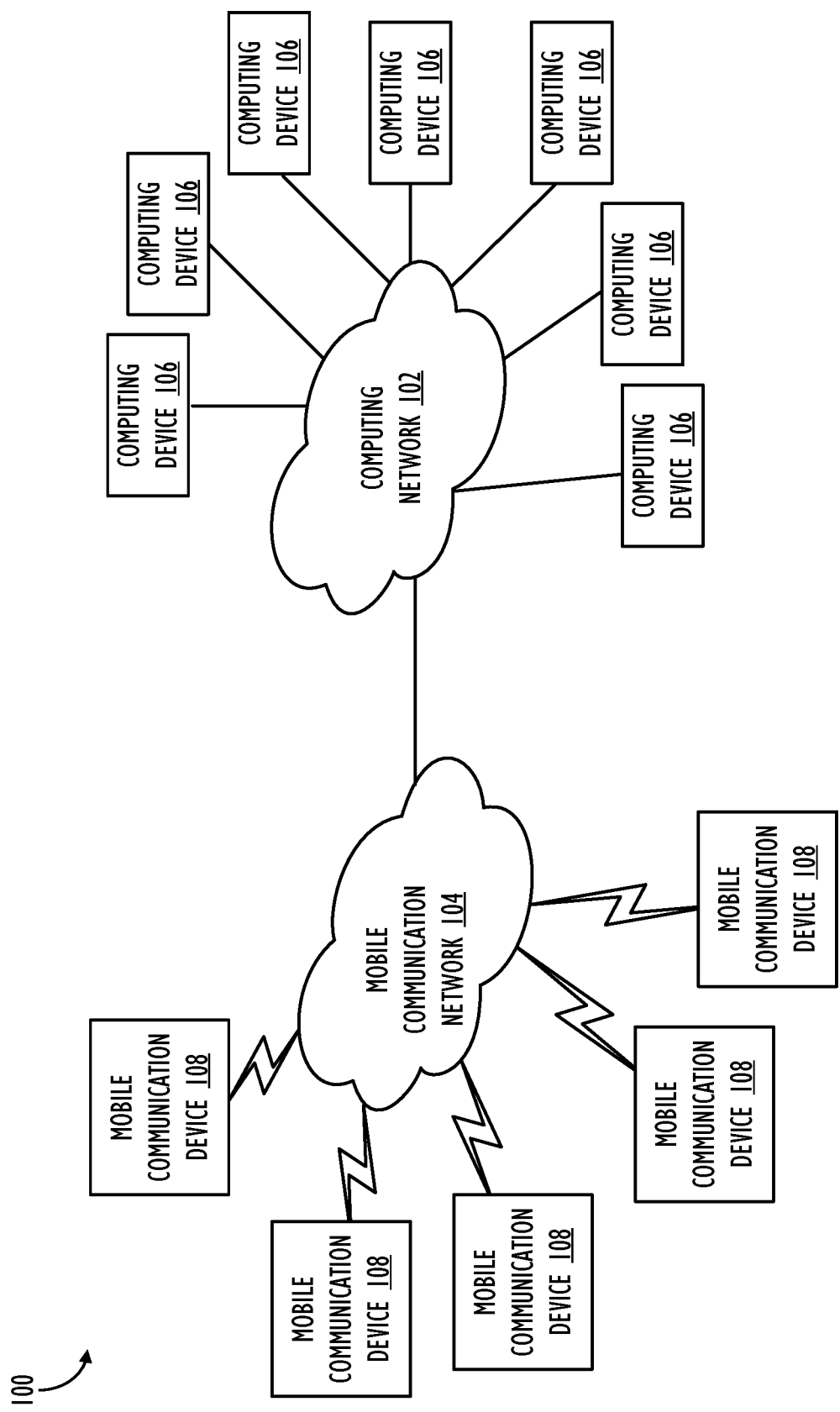
FIG. 1 is a diagram of a network system wherein embodiments of the present disclosure may operate.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The disclosure includes various example embodiments that perform end-to-end room layout estimation. In one or more embodiments, a room layout estimation engine predicts a room layout based on a captured image frame. From the image frame, the room layout estimation engine extracts features (e.g., 2D points) from the image frame and applies the extracted features to construct a set of coefficients that define a set of planes for a given room layout class. The room layout estimation engine inputs the coefficients into a disjunctive normal model that builds a set of planes and subsequently combines the set of planes to generate a prediction plane. Specifically, the prediction plane is formed from the intersection of the combined planes. The room layout estimation engine is then able to generate a prediction plane for each room layout class, which represent different regions of a room, such as a floor, left wall, right wall, front wall, and ceiling. After the room layout estimation engine computes a prediction plane for each room layout class, the room layout estimation engine concatenates the prediction planes together to form the estimated room layout. Additionally, to improve the accuracy of the geometrical model and/or computational efficiency of a SLAM system (e.g., visual inertial odometry (VIO) SLAM system), the room layout estimation engine may be directly embedded and/or coupled to the SLAM system.

For purposes of this disclosure, the term "physical environment" refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, the term "computer-generated reality (CGR) environment" refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

As used herein, the term "virtual reality (VR) environment" refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, the term "mixed reality (MR) environment" refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality.

Within this disclosure, the term "augmented reality (AR) environment" refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

For purposes of this disclosure, "an augmented virtuality (AV) environment" refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

FIG. 1 is a diagram of a network system 100 wherein embodiments of the present disclosure may operate. In FIG. 1, the network system 100 includes a data network 102 and a mobile communication network 104 (e.g., cellular and/or satellite network) that transports data, such as image, position, and/or any other information related to a physical environment. The data network 102 includes one or more networks that transport data using one or more communication protocols. For example, data network 102 may include the Internet, enterprise networks, data centers, wide area networks (WANs), wireless-based networks (e.g., wireless fidelity (WiFi®) and Bluetooth® networks), and/or local area networks (LANs). Networks within data network 102 route data using network protocols that include Internet Protocol (IP), Transmission Control Protocol (TCP), and Ethernet. With reference to FIG. 1, data network 102 includes a variety of computing devices 106, such as computers, servers, hosts, laptops, mobile devices, electronic user devices, robotic systems, and/or any other types of computing devices capable of communicating and transporting data (e.g., physical environment information) within data network 102.

FIG. 1 illustrates that network system 100 also contains a mobile communication network 104 that is coupled to data network 102. The mobile communication network 104 is able to transport data and provide communication services to multiple mobile communication devices 108 that include computers, laptops, mobile devices, and/or other electronic devices that are capable of receiving and transmitting data (e.g., location and map information) over a radio-based communication network. Generally, the mobile communication network 104 is capable of supporting communication between two or more mobile communication devices 108 without the devices being physically connected (e.g., wired connection). The mobile communication network 104 may also incorporate multiple cellular towers and base stations that provide communication services and transport data between mobile communication devices 108 and/or computing devices 106.

In one or more embodiments, the mobile communication devices 108 and/or computing devices 106 represent different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, organic light emitting diodes (OLEDs), LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In one or more embodiments, one or more of the computing devices 106 and/or one or more of the mobile communication devices 108 include a room layout estimation engine the estimates a room layout based on a captured image frame. In other words, the room layout estimation engine receives an image frame of a room and outputs an estimated room layout for the room. To reduce the number of holes or false positive, the room layout estimation engine determines one or more sets of coefficients to input to one or more disjunctive normal models. Each disjunctive normal model employs a determined set of coefficients to produce a prediction plane. To generate a prediction plane, the room layout estimation engine exploits the set of coefficients to generate a number of planes for a given room layout class. The room layout estimation engine then combines the planes and takes the intersection of the combined planes to generate a prediction plane. Each set of coefficients and each prediction plane corresponds to a specific room layout class. After generating the prediction planes for each room layout class, the prediction planes are concatenated and stitched together to generate the estimated room layout.

The room layout estimation engine implemented within computing devices 106 and/or mobile communication devices 108 offers an end-to-end solution. Stated another way, by being an end-to-end room layout estimation, the room layout estimation engine performs machine learning operations that directly learn a solution from a sampled data set. As an example, the room layout estimation engine can be directly trained based on a comparison between a ground truth room layout and the estimated room layout. Because of the comparison, the room layout estimation engine generally has no other losses besides the loss determined from the difference in the ground truth room layout and the estimated room layout. The room layout estimation engine omits intermediary operations, such as a post-processing operation that processes multiple outputs from a neural network (e.g., surrogate key-points and predicted room types). Implementing intermediary operations, such as post-processing, can be computational heavy, potentially cause processing bottlenecks, and can exacerbate relatively small input errors from the neural network.

By employing disjunctive normal models for multiple room layout classes, the room layout estimation engine is not limited to certain assumptions. As an example, some room layout estimation engines generate an estimated room layout by categorizing a given room layout as one of a number of predefined room layout types. Assuming that a given room layout falls within a predefined room layout type could cause scaling issues as the room layout estimation engine attempts to add or learn new room layout types. In comparison, a room layout estimation engine that utilizes disjunctive normal models can scale easier since the engine does not assume that all room layouts should fit into one of the predefined room layout types. Although not required, if a room layout estimation engine that utilizes disjunctive normal models has access to predefined room layout type information, the room layout estimation engine could be configured to leverage the different room layout types to resolve and handle ambiguities.

Another assumption a room layout estimation engine that utilizes disjunctive normal models for multiple room layout classes can omit is utilizing the Manhattan world scene assumption (e.g. assuming Manhattan lines). Manhattan world scene assumption determines scene statistics by assuming city and/or indoor scenes are built accordingly to a Cartesian grid (e.g., x, y, z, coordinate system). The Cartesian grid imposes regularities when aligning the viewer with respect to the Cartesian grid when computing scene statistics. However, a room layout estimation engine that relies on the Manhattan world scene assumption becomes less accurate when estimating curved panes and/or surfaces within an image frame. A room layout estimation engine that utilizes disjunctive normal models for avoids relying on the Manhattan world scene assumption. Instead, the room layout estimation engine generates a number of planes for a given room layout class and takes the disjunction of the conjunction of the planes to generate a prediction plane (e.g., see equations 2 and 4). By taking the disjunction of the conjunction of numerous planes, the room layout estimation engine is able to approximate curved planes and/or surfaces.

In one or more embodiments, the room layout estimation engine may be part of or connected to a VIO SLAM system. Using FIG. 1 as an example, one or more of the computing devices 106 and/or one or more of the mobile communication devices 108 could each represent a VIO SLAM system that includes a room layout estimation engine. In another example, one of the computing devices 106 or mobile communication device 108 represents a VIO SLAM system while another computing device 106 or mobile communication devices 108 includes the room layout estimation engine. A VIO SLAM system is able to optimize computations and/or improve accuracy by using information from the room layout estimation engine. For example, the room layout estimation engine could provide planar constraints to a VIO SLAM system when the system performs feature matching and/or feature triangulation (e.g., converting from 2D to 3D). Additionally, the room layout estimation engine can provide estimated room layouts for previous frames that are used to generate key frames.

Although FIG. 1 illustrates a specific embodiment of a network system 100, the disclosure is not limited to the specific embodiment illustrated in FIG. 1. As discussed above, embodiments of the present disclosure may have the room layout estimation engine and the VIO SLAM system located on separate devices. The separate devices may not simply communicate over data network 102 or mobile communication network 104, but could communicate via both the data network 102 and/or mobile communication network 104. Additionally or alternatively, the room layout estimation engine and/or the VIO system may not transmit and/or receive data using data network 102 and/or mobile communication network 104, and instead may communicate using other forms of transmission, such as a localized connection (e.g., universal serial bus (USB) connection). The VIO SLAM system and/or room layout estimation engine may be also located within other types of electronic devices not explicitly discussed with reference to FIG. 1, such as medical devices transplanted within a human body. The use and discussion of FIG. 1 is only an example to facilitate ease of description and explanation.

Figure 2:
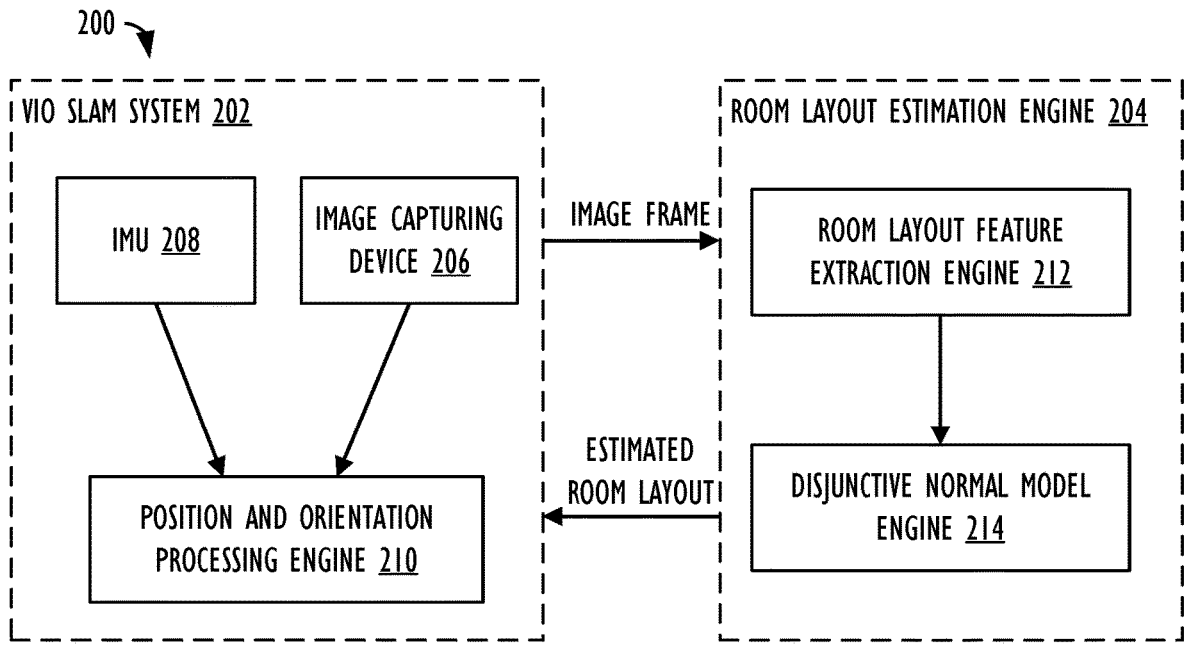
FIG. 2 is a block diagram of a computing system that utilizes a room layout estimation engine in communication with a VIO SLAM system.

FIG. 2 is a simplified block diagram of a computing system that utilizes a room layout estimation engine 204 in communication with a VIO SLAM system 202. Using FIG. 1 as an example, computing system 200 may correspond to one or more of the computing devices 106 and/or one or more of the mobile communication devices 108. In FIG. 2, the VIO SLAM system 202 includes an image capturing device 206 that is able to convert an optical image into an electronic signal (e.g., with an imaging sensor). For example, the image capturing device 206 may utilize a variety of image sensing components, such as a digital charge-coupled device (CCD), a depth sensor, or any combinations thereof, to capture images. FIG. 2 also depicts that the VIO SLAM system 202 includes an inertial measurement unit (IMU) 208 that may include one or more hardware components, such as a gyroscope and/or accelerometer, for recording IMU data of the VIO SLAM system 202. In one example, IMU 208 may measure and report on the VIO SLAM system's 202 six degrees of freedom (x, y, and z Cartesian coordinates, and roll, pitch, and yaw components of the device's angular velocity). IMU 208 may also output other types of IMU data known by persons of ordinary skill in the art for navigation, orientation, and/or position purpose.

In FIG. 2, the VIO SLAM system 202 also includes a position and orientation processing engine 210 that receives captured images from the image capturing device 206 and IMU data from the IMU 208 and computes position and orientation information of the VIO SLAM system 202. Initially, once the position and orientation processing engine 210 receives the IMU data and captured images, the position and orientation processing engine 210 may perform a variety of pre-processing operations that include, but are not limited to, computing feature tracks, selecting keyframes, and mapping IMU data and feature tracks to the keyframes. An image feature may correspond to the image coordinates (e.g., the x-y coordinates) representing a particular location and/or pixel or a group of pixels indicative of an object or a portion of an object in a frame. The pre-processing operations may generate feature tracks by identifying one or more image features in a first frame and then matching those one or more image features with one or more corresponding image features in consecutive frames. Pre-processing operations may select keyframes, a subset of frames received from the image capturing device 206, based on one or more decision rule operations known in the art. A group of keyframes (i.e., set of images) may be referred to as a window throughout this disclosure. Other pre-processing operations could also include associating feature tracks and IMU readings to one or more keyframes, estimating the initial state of the VIO SLAM system 202, estimating the initial position and/or orientation of objects proximate to the VIO SLAM system 202, and/or other operations known in the art.

After performing pre-processing operations, the position and orientation processing engine 210 is able to construct a scaled geometric model of the physical environment. For instance, the position and orientation processing engine 210 may process data one window at a time to generate the scaled geometric model. The scaled geometric model may include model variables that represent state information of the VIO SLAM system 202, such as position, orientation, velocity, and/or inertial biases of the VIO SLAM system 202. The position and orientation processing engine 210 may also include an information matrix that contain multiple entries that represent information regarding the model variables, such as confidence information.

Embodiments of the position and orientation processing engine 210 may perform a variety of operations know by persons having ordinary skill in the art to generate and update the scaled geometric model. For instance, the position and orientation processing engine 210 may include a bundle adjustment engine, a sparse structure marginalization (SSM) engine and a delayed motion marginalization (DMM) engine to generate and update the model variables. The bundle adjustment engine maintains and outputs model variables for post-processing operations. The SSM and DMM engines may perform marginalization, for example, that reduces the number of variables associated with an information matrix. In another embodiment, rather than implementing a bundle adjust engine, the position and orientation processing engine 210 may use a Kalman filter to correct inaccurate scale estimates caused by noise and/or other inaccuracies within the IMU readings.

The position and orientation processing engine 210 may also perform post-processing operations that utilize the information contained in the model variables based on one or more user-applications. Stated another way, the post-processing operations can include various algorithms/programs and/or hardware that utilize the information contained in the model variables depending on the user-application. For example, the post-processing operations may include a program that uses the model variables to determine a path history of the VIO SLAM system 202 and store the path history in memory. As model variables become updated, the position and orientation processing engine 210 is able to take three dimensional (3D) feature position estimates and device state estimates determined at the time of each keyframe and adds those values to a collection (e.g., an array) of historical position and orientation values for the VIO SLAM system 202. The position estimates may then be plotted by the VIO SLAM system 202 on a map or other grid to illustrate the path travelled by the VIO SLAM system 202.

In FIG. 2, the image capturing device 206 may provide one or more image frames to a room layout estimation engine 204 implemented using hardware, software, or combinations thereof. The room layout estimation engine 204 performs one or more machine learning operations that generate an estimated room layout for an image frame while minimizing holes, false positives, and/or other artifacts. For example, the room layout estimation engine 204 includes a neural network trained to extract features (e.g., 2D points from the image frame) associated with a room (e.g., an interior room) from the image frame. The neural network uses the room layout features to construct multiple sets of coefficients that define multiple sets of planes for multiple room layout classes. The room layout estimation engine 204 applies the different sets of coefficients to multiple disjunctive normal models to build the multiple sets of planes for the multiple room layout classes. For each room layout class, the room layout estimation engine 204 subsequently combines a set of planes to generate a prediction plane. By doing so, the room layout estimation engine 204 generates a prediction plane for each room layout class. Afterwards, the room layout estimation engine 204 concatenates the prediction planes together to form the estimated room layout. The estimated room layout are then sent back to the VIO SLAM system 202 for processing.

In FIG. 2, the room layout estimation engine 204 includes a room layout feature extraction engine 212 that extracts features from an image frame. In one or more embodiments, to extract features from the image frame, the room layout feature extraction engine 212 performs semantic segmentation to locate and classify pixels within the image frame to different regions in a room. In particular, the room layout feature extraction engine 212 is able to divide an image frame by locating the presence of walls, ceiling, and floor regions within the image frame. The different regions of the image frame represent the different room layout classes. In one or more embodiments, the room layout feature extraction engine 212 can utilize a neural network to segment the image frame. Portions of the neural network could be trained to discriminate between different room layout classes. For example, one portion (e.g., one or more neurons) of a neural network that corresponds to a ceiling class learns to distinguish between a ceiling and non-ceiling regions of the image frame. Another portion of the neural network that corresponds a floor class learns to disguise between a floor and non-floor regions of the image frame.

In addition to performing semantic segmentation, the room layout feature extraction engine 212 is able to produce coefficients for generating planes for a specific room layout class. As previous described, an image frame includes multiple regions that correspond to different room layout classes. For each of the room layout classes, the room layout feature extraction engine 212 generates a set of coefficients for the disjunctive normal model engine 214 to use and generate prediction planes. In one or more embodiments, the number of coefficients within a set of coefficients is based on the number of variables used to represent the planes in a specific dimension. As an example, in a 2D space, the number of variables could be three (e.g., (x, y, 1)), and thus, room layout feature extraction engine 212 can generate three coefficients for each room layout class. In another example, in a 3D space, the number of variables could be four (e.g., (x, y, z, 1)), and thus, room layout feature extraction engine 212 can generate four coefficients for each room layout class. The room layout feature extraction engine 212 may also utilize the neural network to generate a set of coefficients for each room layout class. Examples of neural networks that room layout feature extraction engine 212 could utilize include a convolutional neural network (CNN), a fully convolutional network (FCN), a recurrent neural networks (RNN) and/or any other type of neural network well known in the art.

After receiving the sets of coefficients from the room layout feature extraction engine 212, the disjunctive normal model engine 214 uses the multiple sets of coefficients to generate multiple prediction planes. Recall that each set of coefficients corresponds to a specific room layout class. For each set of coefficients, the disjunctive normal model engine 214 is able to perform a disjunctive normal model operation to generate one or more planes. In one embodiment, for a 2D image frame, the plane space can be defined as a Boolean function shown in equation 1:

$$h_{ijk} = \begin{cases} 1 & \text{if } a_{ijk}x + b_{ijk}y + c_{ijk} \geq 0 \\ 0 & \text{otherwise} \end{cases} \quad (1)$$

In equation 1, the variable "$h_{ijk}$" represents a defined plane based on the set of coefficients. Variables "$a_{ijk}$", "$b_{ijk}$", "$c_{ijk}$" represents the coefficients determined from room layout feature extraction engine 212. In other words, "$a_{ijk}$" represents a weight value for x values in the 2D image frame; "$b_{ilk}$" represents a weight value for y values in the 2D image; and "$c_{ijk}$" represents a bias term for the defined plane.

To generate a prediction plane, from the defined planes, the disjunctive normal model engine 214 can perform a disjunction of a conjunction of the defined planes. For example, using the Boolean function shown in equation 1, the disjunction of a conjunction operation to generate a prediction plane can be defined as a characteristic function as shown below in equation 2:

$$f_k(x, y) = \bigvee_{i=1}^{M} \bigwedge_{j=1}^{N} h_{ijk}(x, y) \quad (2)$$

In equation 2, the variable "$f_k(x, y)$" represents the characteristic function for a prediction plane. The characteristic function "$f_k(x, y)$" takes N planes, which are defined as the Boolean equation function shown in equation 1, combines them, and takes the intersection of the combined N planes to generate at least a portion of the prediction plane. Taking the intersection of the combined N planes can also be referred to as a conjunction operation of the N planes. The characteristic function "$f_k(x, y)$" then combines the M portions of the prediction plane, which can as be referenced as a disjunctive operation, to generate the prediction plane. In one or more embodiments, the value of M can be set to a value of one.

Equations 1 and 2 defines planes and prediction planes for a binary case. To handle continuous cases, equations 1 and 2 can be rewritten as shown in equation 3 and 4, respectively.

$$\sigma_{ijk} = \frac{1}{1 + e^{-(a_{ijk} + b_{ijk} + c_{ijk})}} \quad (3)$$

$$f_k(x, y) \approx 1 - \prod_{i=1}^{M} \left[ 1 - \prod_{j=1}^{N} \sigma_{ijk}(x, y) \right] \quad (4)$$

In particular, equation 3 defines the planes, represented as variable "$\sigma_{ijk}$" using a logistic sigmoid function. The characteristic function "$f_k(x, y)$" in the continuous case is approximately defined as shown in equation 4. Specifically, the characteristic function "$f_k(x, y)$" takes the product of the N planes, where each plane is defined as logistic sigmoid function and then complements the product of the N planes to form at least a portion of the prediction plane. Afterwards, the characteristic function "$f_k(x, y)$" takes and complements the product of M portions of the prediction plane to generate the prediction plane. The disjunctive normal model engine 214 then computes each of the prediction planes and concatenates the prediction planes to generate the estimated room layout.

Figure 3:
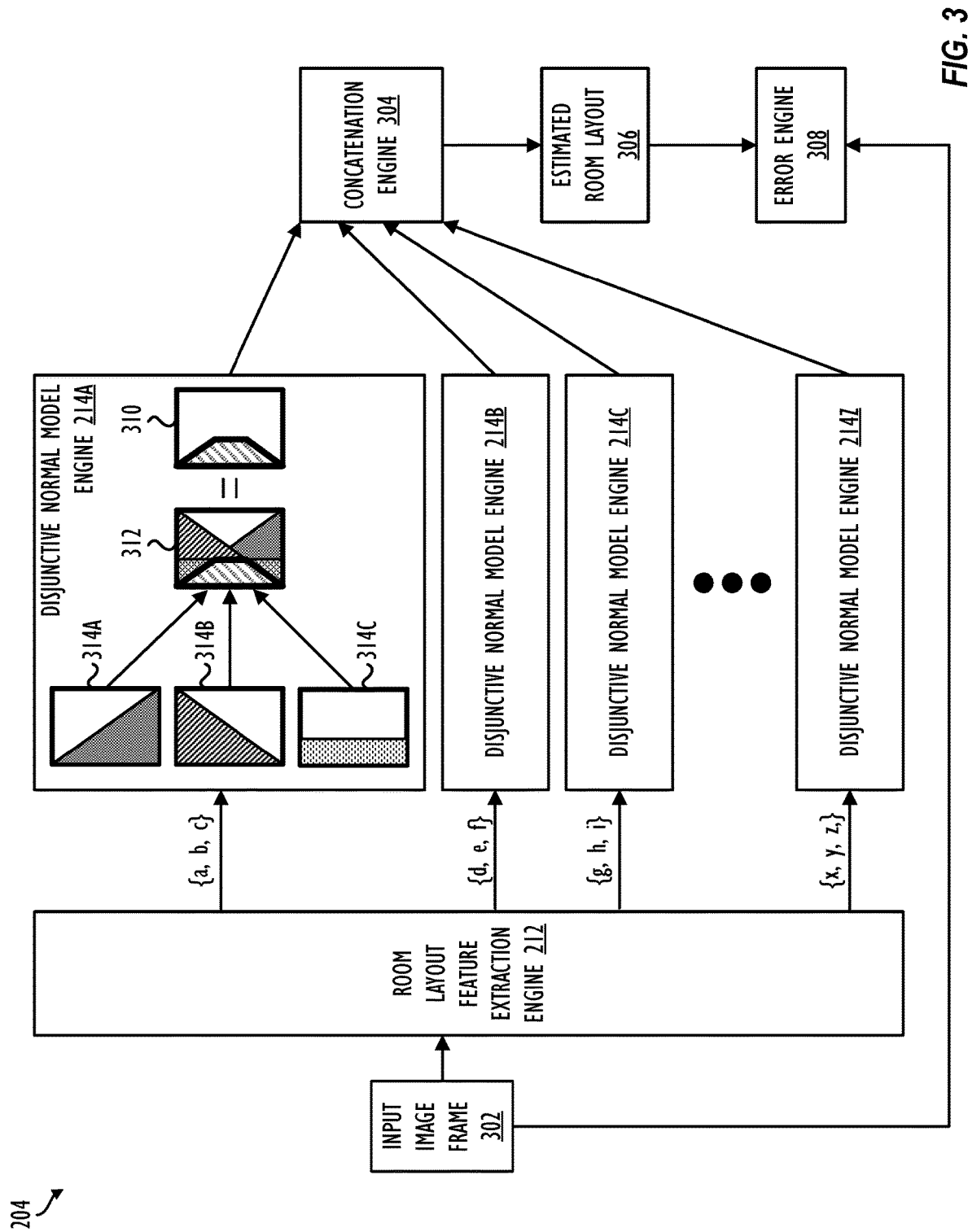
FIG. 3 is a block diagram of an embodiment of a room layout estimation engine.

FIG. 3 is a block diagram of an embodiment of a room layout estimation engine 204. In FIG. 3, an input image 302 is sent to the room layout feature extraction engine 212 to determine room layout classes and generate a set of coefficients for each room layout class. In particular, a first set of coefficients {a, b, c} are sent to disjunctive normal model engine 214A, which corresponds to a first room layout class (e.g., left wall); a second set of coefficients {d, e, f} are sent to disjunctive normal model engine 214B, which corresponds to a second room layout class (e.g., right wall); a third set of coefficients {g, h, i} are sent to disjunctive normal model engine 214C, which corresponds to a first room layout class (e.g., ceiling), and etc. In one embodiment, the room layout feature extraction engine 212 may utilize a CNN to determine room layout classes and generate a set of coefficients for each room layout class. Other embodiments could have the room layout feature extraction engine 212 implement other types of neural networks and/or any other operations known in the art to extract features from image frames.

When disjunctive normal model engines 214A-214Z (which are collectively referred to as 214) receive their corresponding set of coefficients, each disjunctive normal model engine 214A-214Z generate planes for estimating the planar characteristic for each room layout class. For example, disjunctive normal model engine 214A uses the set of coefficients {a, b, c} to generate planes 314A-314C for a specific room layout class (e.g., the left wall). The disjunctive normal model engine 214A could utilize plane reconstruction blocks (not shown in FIG. 3) to generate planes 314A-314C. The plane reconstruction blocks create planes 314A-314C according to equations 1 or 3 previously discussed. Although FIG. 3 illustrates that disjunctive normal model engine 214A generates three planes 314A-314C, other implementations could have the disjunctive normal model engine 214A generate a different number of planes 314 (e.g., one, two, or more than three planes). The more planes 314 disjunctive normal model engine 214A generates, the better disjunctive normal model engine 214A is able to approximate planar characteristics (e.g., curved planes and/or surfaces).

As shown in FIG. 3, the disjunctive normal model engine 214A then combines the planes 314A-314C to generate combined planes 312. As described in equations 2 and 4, the disjunctive normal model engine 214A takes the intersection of the combined plane 312 (e.g., conjunction operation) to generate one or more portions of a prediction plane 310. Based on equation 4, the disjunctive normal model engine 214A could also complement the intersection of the combined planes to generate portions of prediction plane 310. The disjunctive normal model engine 214A then performs a disjunctive operation to combine the different portions of the prediction plane 310. FIG. 3 illustrates that the disjunctive normal model engine 214A generates the entire prediction plane 310 (e.g., M=1). Other embodiments could have the disjunctive normal model engine 214A generate multiple portions of the prediction plane 310 (e.g., M=2 or more).

The room layout estimation engine 204 then receives the prediction planes 310 from each of the disjunctive normal model engine 214A-214Z and performs a concatenation operation using concatenation engine 304. Persons of ordinary skill in the art are aware that a variety of concatenation operations can be used to stitch the prediction planes 310 together. After concatenating the prediction planes 310 for each room layout class, the room layout estimation engine 204 generates an estimated room layout 306. During the training phase, the room layout estimation engine 204 is able to compare the estimated room layout 306 and the input image frame 302 (e.g., a ground truth room layout) at the error engine 308. By doing so, the room layout estimation engine 204 is able to provide an end-to-end room layout estimation.

Figure 4:
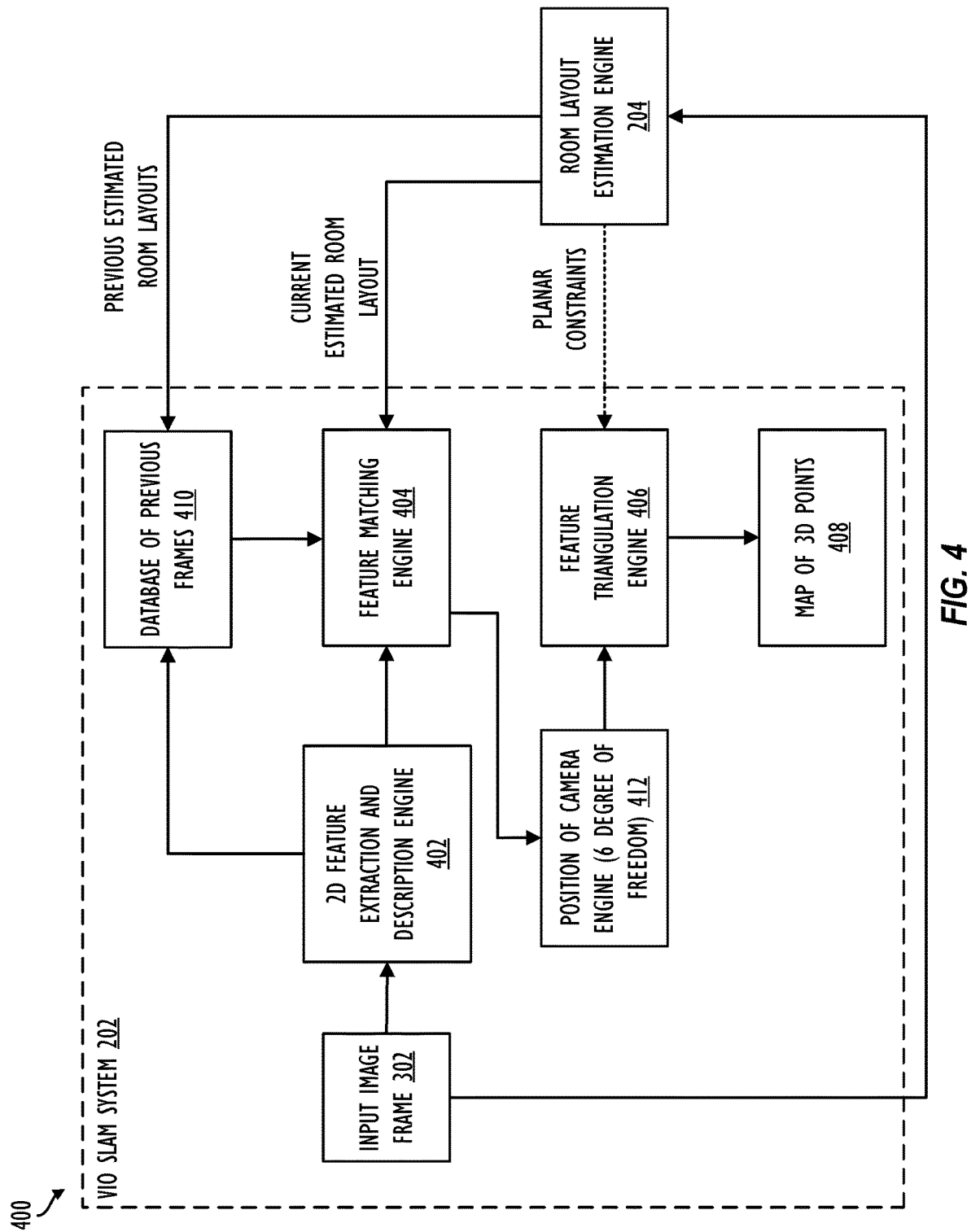
FIG. 4 is a simplified block diagram of an embodiment of a computing system that incorporates a room layout estimation engine with a VIO SLAM system.

FIG. 4 is another simplified block diagram of an embodiment of a computing system 400 that incorporates a room layout estimation engine 204 with a VIO SLAM system 202. The VIO SLAM system 202 obtains an input image frame 302 and provides the input image frame to a 2D feature extraction and description engine 402. The 2D feature extraction and description engine 402 extracts multiple 2D features from the input image frame. The 2D feature extraction and description engine 402 then applies a description (e.g., naming properties of a certain pixel) to each of the 2D features so that the extracted 2D features can be searched and/or found.

The extracted 2D features and description is then sent to a feature matching engine 404 and the database of previous frames 410. The feature matching engine 404 uses the extracted 2D features and description to determine whether the VIO SLAM system 202 has previously viewed and analyzed the extracted 2D features. The feature matching engine 404 obtains keyframes from the database of previous fames 410 to determine whether the extracted 2D features have been previously observed and analyzed. Persons of ordinary skill in the art are aware that each keyframe also includes feature descriptions associated with previous frames. The feature matching engine 404 uses the information from the keyframes and determine whether the extracted 2D features match features from the keyframes.

The feature matching engine 404 then sends the matched 2D features to a feature triangulation engine 406. The feature triangulation engine 406 converts the matched 2D features into 3D features. At the same time, the position camera engine 412 uses the 2D features from the feature matching engine 404 to determine the camera's six degrees of freedom position (x, y, and z Cartesian coordinates, and roll, pitch, and yaw components of the device's angular velocity). The feature triangulation engine 406 then utilizes the 3D features and the camera position to generate and/or update a map of 3D points 408.

The room layout estimation engine 204 can improve the accuracy for one or more engines within the VIO SLAM system 202. As shown in FIG. 4, the room layout estimation engine 204 provides previous estimated room layouts to the database of previous frames 410 and current estimated room layout to the feature matching engine 404. Based on the previous estimated room layouts and current estimated room layout, the room layout estimation engine 204 provides planar constraints to the feature matching engine 404 that simplify and improve the accuracy of 2D feature matching. For example, the feature matching engine 404 can relatively quickly determine whether the 2D features belong to a left wall, right wall, ceiling, or floor by utilizing the room layout information from the room layout estimation engine 204. The room layout estimation engine 204 also indirectly provides planar constraints to the feature triangulation engine 406 that are useful in resolve any noise and/or ambiguities to generate more accurate 3D features.

Figure 5:
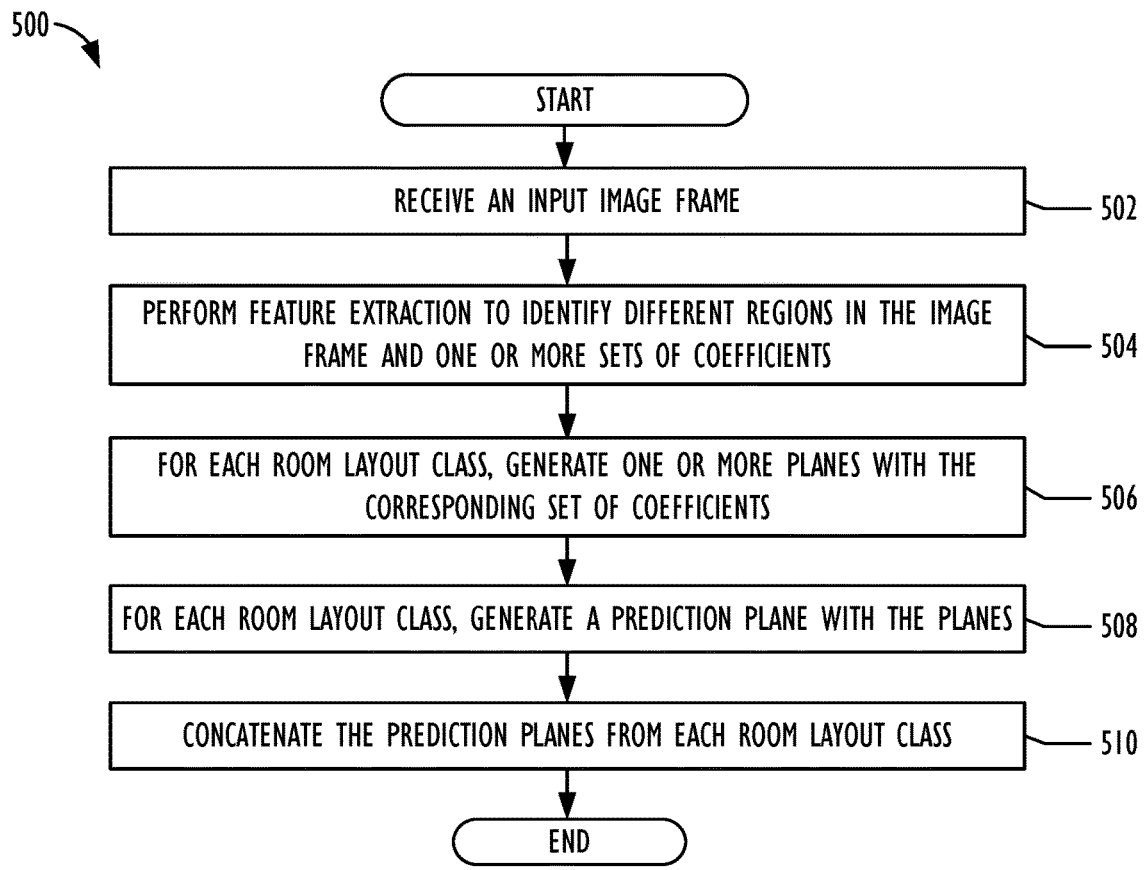
FIG. 5 depicts a flowchart illustrating an operation for performing a room layout estimation.

FIG. 5 depicts a flowchart illustrating an operation 500 for performing a room layout estimation. Specifically, operation 500 provides an end-to-end solution for generating an estimated room layout. In one embodiment, operation 500 may be implemented within the computing system 200 and/or room layout estimation engine 204 shown in FIG. 2. Although FIG. 5 illustrates that the blocks within operation 500 are implemented in a sequential order, operation 500 is not limited to this sequential order. The use and discussion of FIG. 5 is only an example to facilitate explanation and is not intended to limit the disclosure to this specific example.

Operation 500 may start at block 502 receive an input image frame. Using FIG. 3 as an example, operation 500 may receive an input image frame 302 that includes image data for a room. In addition to capturing the overall room layout, the input image frame could also contain other objects (e.g., furniture, paintings, pictures, electronics, etc.) that occlude or partially occlude different regions of the room (e.g., floor, ceiling, and walls). Operation 500 then moves to block 504 and performs feature extraction to identify different regions in the image frame and one or more sets of coefficients. With reference to FIGS. 2 and 3, at block 504, operation 500 performs the same operations as described with respect to the room layout feature extraction engine 212. Recall that each set of coefficients correspond to a specific room type class and the features can represent 2D points associated with a specific region of image frame.

Operation 500 then continues to block 506 and for each room layout class, generate one or more planes with the corresponding set of coefficients. In other words, for a given set of coefficients (e.g., three coefficients for a 2D space), operation 500 generates one or more planes for the specific room type class. For example, operation 500 uses equation 3, which was previously described, to generate the different planes. Operation 500 then moves to block 508 and for each room layout class, operation 500 generates a prediction plane with the planes generated at block 506. As an example, operation 500 utilizes equation 4, which was also previously described, to generate the prediction. Operation 500 then moves to block 510 and concatenates the prediction planes from each room layout class.

Figure 6:
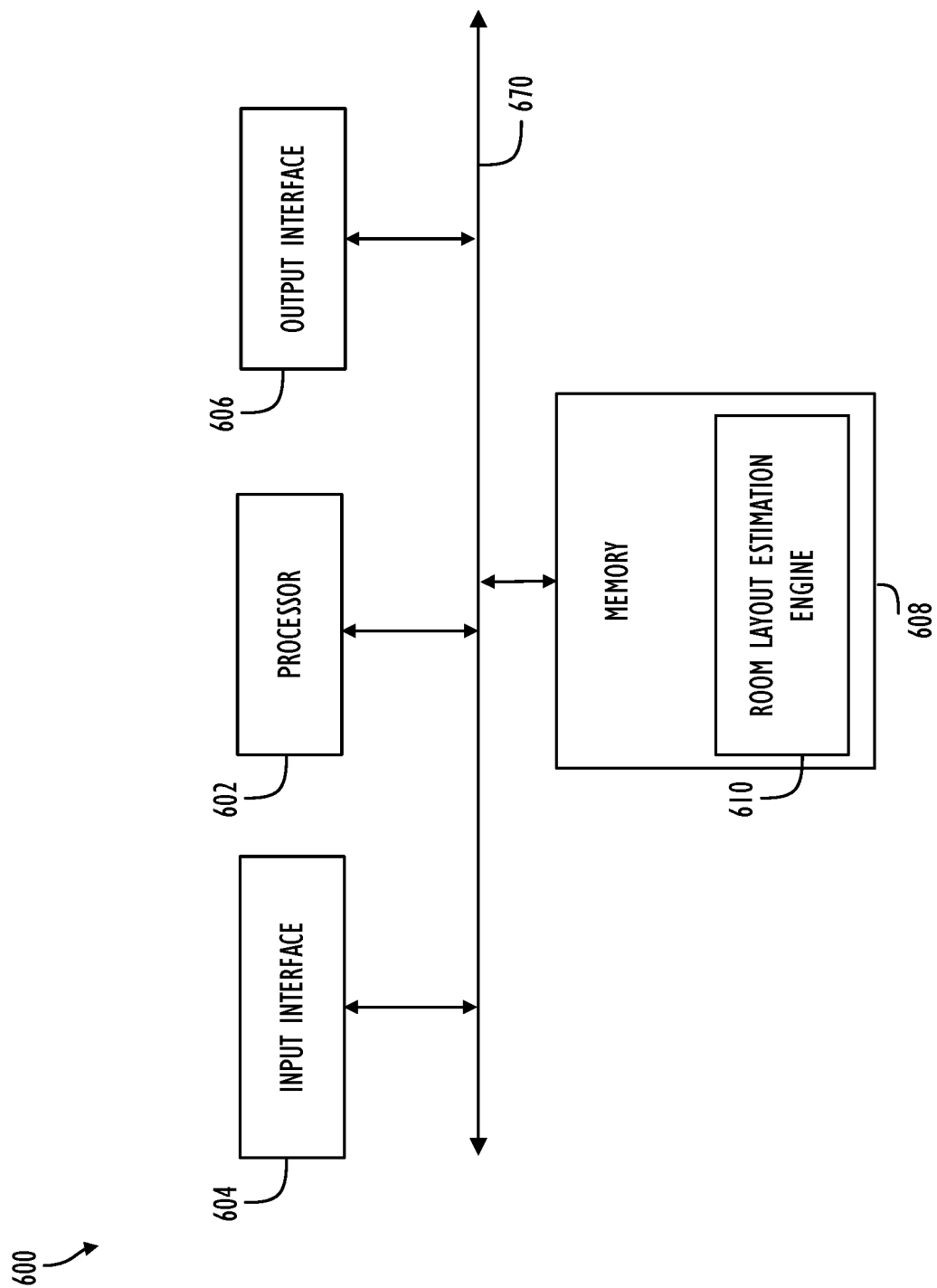
FIG. 6 is a simplified block diagram of a computing system that includes a room layout estimation engine.

FIG. 6 is a simplified block diagram of a computing system 600 that includes a room layout estimation engine 610 that may correspond to or may be part of a computer and/or any other computing device, such as a workstation, server, mainframe, super computer, and/or portable computing device. With reference to FIG. 1, computing system 600 may correspond to computing device 106 and/or mobile communication devices 108. The computing system 600 comprises a processor 602, which may be also be referenced as a central processor unit (CPU). The processor 602 may communicate (e.g., via a system bus 670) and/or provide instructions to other components within the computing system 600, such as the input interface 604, output interface 606, and/or memory 608. In one embodiment, the processor 602 may comprise one or more multi-core processors and/or memory mediums (e.g., cache memory) that function as buffers and/or storage for data. Additionally, processor 602 may be part of one or more other processing components, such as application specific integrated circuits (ASICs), field-programmable gate arrays (FPGAs), and/or digital signal processors (DSPs). Although FIG. 6 illustrates that processor 602 may be a single processor, processor 602 is not so limited and instead may represent multiple processors. The processor 602 may be configured to implement any of the operations described herein, which include operation 500 as described in FIG. 5.

FIG. 6 illustrates that memory 608 may be operatively coupled to processor 602. Memory 608 may be a non-transitory medium configured to store various types of data. For example, memory 608 may include one or more memory devices that comprise secondary storage, read-only memory (ROM), and/or random-access memory (RAM). The secondary storage is typically comprised of one or more disk drives, optical drives, solid-state drives (SSDs), and/or tape drives and is used for non-volatile storage of data. In certain instances, the secondary storage may be used to store overflow data if the allocated RAM is not large enough to hold all working data. The secondary storage may also be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions.

As shown in FIG. 6, the memory 608 may be used to house the instructions for carrying out various embodiments described herein. In an embodiment, the memory 608 may comprise a room layout estimation engine 610 that may be accessed and implemented by processor 602. Additionally or alternatively, room layout estimation engine 610 may be stored and accessed within memory embedded in processor 602 (e.g., cache memory). The room layout estimation engine 610 may be configured to provide computer executable instructions used for determining a set of coefficients for a specific room layout class, generate planes with the set of coefficients, generate a prediction plane with the planes, and combining the predictions planes for each room layout class to generate an estimated room layout. In one embodiment, the room layout estimation engine 610 may be implemented using the room layout estimation engine 214 as shown in FIG. 2 and/or operation 500 as described in FIG. 5. In one embodiment, memory 608 may interface with a system bus 670 (e.g., a computer bus) so as to communicate and/or transmit information stored in memory 608 to processor 602 during execution of software programs, such as software applications that comprise program code, and/or computer executable process steps that incorporate functionality described herein.

Persons of ordinary skill in the art are aware that software programs may be developed, encoded, and compiled in a variety computing languages for a variety software platforms and/or operating systems and subsequently loaded and executed by processor 602. In one embodiment, the compiling process of the software program, may transform program code written in a programming language to another computer language such that the processor 602 is able to execute the programming code. For example, the compiling process of the software program may generate an executable program that provides encoded instructions (e.g., machine code instructions) for processor 602 to accomplish specific, non-generic, particular computing functions, such as estimating a room layout based on an input image frame.

After the compiling process, the room layout estimation engine 610 may be loaded as computer executable instructions or process steps to processor 602 from storage (e.g., memory 608, storage medium/media, removable media drive, and/or other storage device) and/or embedded within the processor 602. Processor 602 can execute the stored instructions or process steps in order to perform instructions or process steps (e.g., room layout estimation engine 610) to transform computing system 600 into a non-generic, particular, specially programmed machine or apparatus. Stored data, e.g., data stored by a storage device, can be accessed by processor 602 during the execution of computer executable instructions or process steps to instruct one or more components within computing system 600.

Alternatively, rather than programming and/or loading executable instructions onto memory 608 and/or processor 602 to form a non-generic, particular machine or apparatus, persons of ordinary skill in the art are aware that stored instructions may be converted and implemented as hardware customized for a particular use. In one embodiment, implementing instructions, such as estimating room layout, by loading executable software into a computing device, can be converted to a hardware implementation by well-known design rules. For example, the compiling process of the software program, (e.g., room layout estimation engine 610 may build a sequence of instruction bits that control and arrange a sequence of control gate-level components that write data onto buses, into latches and registers, across channels, memory, and/or other components of the processor 602 and/or memory 608. The compiling of the room layout estimation engine 610 may produce gate-level components with fixed relationships designed to accomplish specific, non-generic, particular computing functions.

The decisions between implementing a concept in software versus hardware may depend on a number of design choices that include stability of the design and numbers of units to be produced and issues involved in translating from the software domain to the hardware domain. Often a design may be developed and tested in a software form and subsequently transformed, by well-known design rules, to an equivalent hardware implementation in an ASIC or other application specific hardware that hardwires the instructions or process steps of the software. In the same manner as a machine controlled by a new ASIC is a non-generic, particular, specially programmed machine or apparatus, likewise a computing device (e.g., a computer) that has been programmed and/or loaded with executable instructions or process steps (e.g., the room layout estimation engine 610) should be viewed as a non-generic, particular, specially programmed machine or apparatus.

FIG. 6 also illustrates that the processor 602 may be operatively coupled to an input interface 604 configured to receive input image frame, and output interface 606 configured to output and/or display the estimated room layout. The input interface 604 may be configured to obtain input frames and/or other sensor-based information via cables, connectors, wireless connections and/or other communication protocols. In one embodiment, the input interface 604 may be a network interface that comprises multiple ports configured to receive and/or transmit data via a network. In particular, the network interface may transmit the image data via wired links, wireless link, and/or logical links. Other examples of the input interface 604 may be universal serial bus (USB) interfaces, CD-ROMs, DVD-ROMs and/or connections to one or more sensors. The output interface 606 may include to one or more connections for a graphic display (e.g., monitors), a printing device that produces hard-copies of the generated results, and/or a plurality of ports that transmit data via cables, connectors, wireless connections, and/or other communication protocols.

Persons of ordinary skill in the art are aware that the computing system 600 may comprise other components well known in the art, such as sensors, powers sources, and/or analog-to-digital converters, not explicitly shown in FIG. 6. For ease of discussion, FIG. 6 may exclude other common or typical in computer vision components (e.g., SLAM system) known by persons of ordinary skill in the art.

Reference in this disclosure to "one embodiment" or to "an embodiment" means that a particular feature, structure, or characteristic described in connection with the embodiment is included in at least one embodiment of the disclosure, and multiple references to "one embodiment" or "an embodiment" should not be understood as necessarily all referring to the same embodiment. The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

At least one embodiment is disclosed and variations, combinations, and/or modifications of the implementation(s) and/or features of the implementation(s) made by a person having ordinary skill in the art are within the scope of the disclosure. Alternative implementations that result from combining, integrating, and/or omitting features of the implementation(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Many other implementations will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A non-transitory program storage device, readable by one or more processors and comprising instructions stored thereon to cause the one or more processors to:
   perform feature extraction on an image frame that includes a room to generate a first set of coefficients for a first room plane type and a second set of coefficients for a second room plane type;
   generate, by a first disjunctive normal model associated with the first room plane type, a first set of planes based on the first set of coefficients;
   generate, based on the first set of planes, a first prediction plane for the first room plane type;
   generate, by a second disjunctive normal model associated with the second room plane type, a second set of planes based on the second set of coefficients;
   generate a second prediction plane based on the second set of planes; and
   combine the first prediction plane and the second prediction plane to generate a predicted room layout for the room.

2. The non-transitory program storage device of claim 1, wherein a neural network is used to perform the feature extraction.

3. The non-transitory program storage device of claim 1, wherein the instructions that cause the processors to generate the first prediction plane based on the first set of planes further comprises instructions that cause the processors to:
   combine the first set of planes;
   determine an intersection of the combined first set of planes; and
   generate the first prediction plane according to the intersection of the combined first set of planes.

4. The non-transitory program storage device of claim 1, wherein the instructions that cause the processors to generate the first prediction plane based on the first set of planes further comprises instructions that cause the processors to:
   combine the first set of planes;
   determine an intersection of the combined first set of planes, wherein the intersection of the combined first set of planes represents a first portion of the first prediction plane; and
   combine the first portion of the first prediction plane with a second portion of the first prediction plane to generate the first prediction plane.

5. The non-transitory program storage device of claim 1, wherein the first set of coefficients and the second set of coefficients correspond to a two dimensional (2D) space.

6. The non-transitory program storage device of claim 1, wherein the first room plane type and the second room plane type correspond to different regions of an image frame.

7. The non-transitory program storage device of claim 1, wherein the instructions further cause the processors to:
   generate a third set of coefficients for a third room plane type based on performing feature extraction on the image frame;
   generate a third set of planes based on the third set of coefficients;
   generate a third prediction plane based on the third set of planes; and
   combine the first prediction plane, the second prediction plane, and the third prediction plane to generate the predicted room layout.

8. The non-transitory program storage device of claim 1, wherein the instructions further cause the processors to provide the predicted room layout to a Simultaneous Localization and Mapping (SLAM) system.

9. A system comprising:
   memory comprising instructions; and
   at least one processor coupled to memory, wherein the instructions, when executed, causes the at least one processor to:
      perform feature extraction on an image frame that includes a room to generate a first set of coefficients for a first room plane type and a second set of coefficients for a second room plane type;
      generate, by a first disjunctive normal model associated with the first room plane type, a first set of planes based on the first set of coefficients;
      generate, based on the first set of planes, a first prediction plane for the first room plane type;
      generate, by a second disjunctive normal model associated with the second room plane type, a second set of planes based on the second set of coefficients;
      generate a second prediction plane based on the second set of planes; and
      combine the first prediction plane and the second prediction plane to generate a predicted room layout for the room.

10. The system of claim 9, wherein a convolution neural network is used to perform the feature extraction.

11. The system of claim 9, wherein the instructions that cause the at least one processor to generate the first prediction plane based on the first set of planes further comprises instructions that cause thee at least one processor to:
   combine the first set of planes;
   determine an intersection of the combined first set of planes; and
   generate the first prediction plane according to the intersection of the combined first set of planes.

12. The system of claim 9, wherein the instructions that cause the at least one processor to generate the first prediction plane based on the first set of planes further comprises instructions that cause the processors to:
   combine the first set of planes;
   determine an intersection of the combined first set of planes, wherein the intersection of the combined first set of planes represents a first portion of the first prediction plane; and
   combine the first portion of the first prediction plane with a second portion of the first prediction plane to generate the first prediction plane.

13. The system of claim 9, wherein the first set of coefficients and the second set of coefficients correspond to a two dimensional (2D) space.

14. The system of claim 9, wherein the first room plane type and the second room plane type correspond to different regions of the room captured in the image frame.

15. The system of claim 9, wherein the instructions further cause the at least one processor to:
   generate a third set of coefficients for a third room plane type based on performing feature extraction on the image frame;
   generate a third set of planes based on the third set of coefficients;
   generate a third prediction plane based on the third set of planes; and
   combine the first prediction plane, the second prediction plane, and the third prediction plane to generate the predicted room layout.

16. A computer-implemented method comprising:
   performing feature extraction on an image frame that includes a room to generate a first set of coefficients for a first room plane type and a second set of coefficients for a second room plane type;
   generating, by a first disjunctive normal model associated with the first plane type, a first set of planes according to the first set of coefficients;
   generating, based on the first set of planes, a first prediction plane for the first room plane type;
   generating, by a second disjunctive normal model associated with the room second plane type, a second set of planes based on the second set of coefficients;
   generating a second prediction plane based on the second set of planes; and
   combining the first prediction plane and the second prediction plane to generate a predicted room layout for the room.

17. The method of claim 16, wherein generating the first prediction plane based on the first set of planes further comprises:
   combining the first set of planes;
   determining an intersection of the combined first set of planes; and
   generating the first prediction plane according to the intersection of the combined first set of planes.

18. The method of claim 16, wherein generating the first prediction plane based on the first set of planes further comprises:
   combining the first set of planes;
   determining an intersection of the combined first set of planes, wherein the intersection of the combined first set of planes represents a first portion of the first prediction plane; and
   combining the first portion of the first prediction plane with a second portion of the first prediction plane to generate the first prediction plane.

19. The method of claim 16, wherein the first room plane type and the second room plane type correspond to different regions of the room captured in the image frame.

20. The method of claim 16, further comprising providing the predicted room layout to a Simultaneous Localization and Mapping (SLAM) system.

\* \* \* \* \*